No. 847,025. PATENTED MAR. 12, 1907.
A. PEDERSON.
PLOW.
APPLICATION FILED MAY 7, 1904.

2 SHEETS—SHEET 1.

Witnesses
E. K. Reichenbach
W. C. Kepes

Inventor
A. Pederson
By Chandlee & Chandlee
Attorneys

No. 847,025. PATENTED MAR. 12, 1907.
A. PEDERSON.
PLOW.
APPLICATION FILED MAY 7, 1904.
2 SHEETS—SHEET 2.
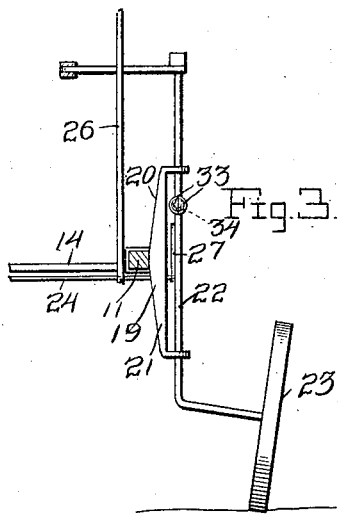
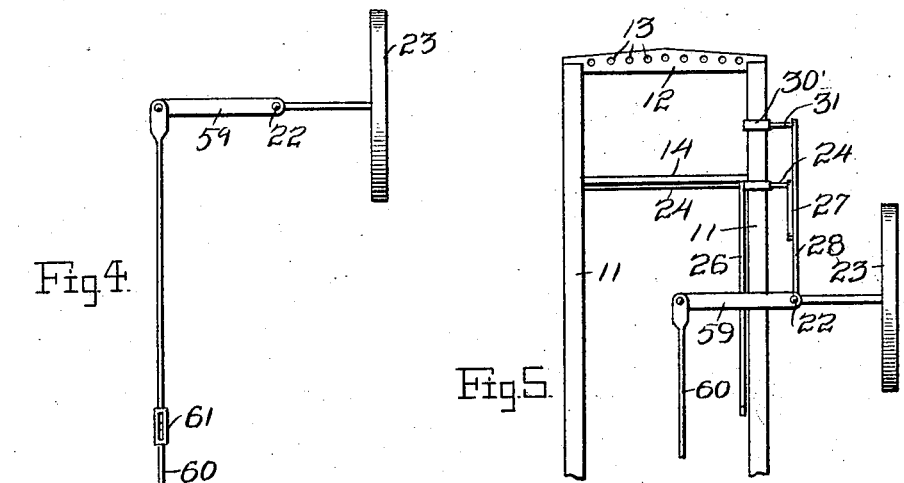
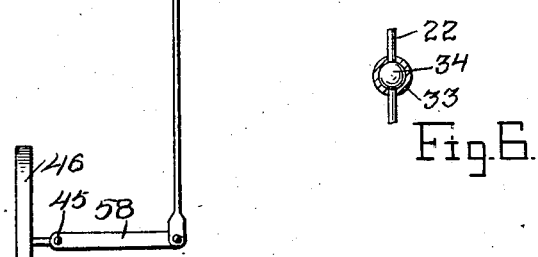
Witnesses
E. K. Reichenbach
W. C. O. Eyer
Inventor
A. Pederson
By
Chandler & Chandler
Attorneys

UNITED STATES PATENT OFFICE.

ANDREW PEDERSON, OF EFFINGTON, SOUTH DAKOTA.

PLOW.

No. 847,025.

Specification of Letters Patent.

Patented March 12, 1907.

Application filed May 7, 1904. Serial No. 206,885.

*To all whom it may concern:*

Be it known that I, ANDREW PEDERSON, a citizen of the United States, residing at Effington, in the county of Roberts, State of South Dakota, have invented certain new and useful Improvements in Plows; and I do hereby declare the following to be a full, clear, and exact description of the invention, such as will enable others skilled in the art to which it appertains to make and use the same.

This invention relates to plows, and more particularly to the class of wheeled plows, the object of the invention being to provide a construction wherein the plow-beam may be raised or lowered at either its front end or rear end, in which said adjustment may be easily and quickly effected, and which the parts will be held securely in their different positions.

Figure 1:
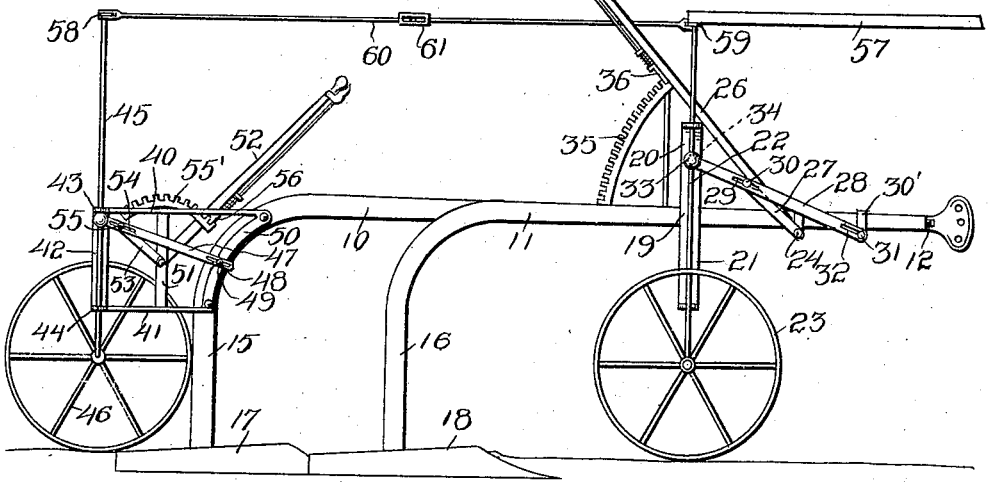
Figure 2:
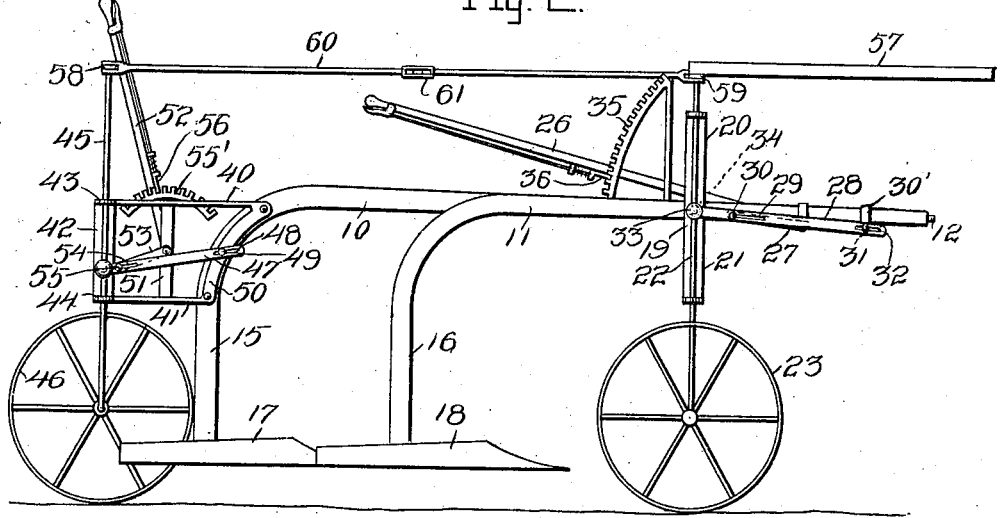

In the drawings forming a portion of this specification, and in which like numerals of reference indicate similar parts in the several views, Figure 1 is a side elevation showing a plow with the beam thereof in lowered position. Fig. 2 is a view similar to Fig. 1 with the plow-beam in raised position. Fig. 3 is a transverse section through the beam, showing the mounting of the front caster-wheel. Fig. 4 is a detail view showing the connections between the stems of the front and rear casters. Fig. 5 is a top plan view showing the forward portions of the beams. Fig. 6 is a detail vertical sectional view through one end of the lifting-lever for the frame, showing the manner of connecting the same with the stem of the caster-wheel.

Referring now to the drawings, there is shown a plow comprising the two beams 10 and 11, which are connected at their front ends by the brace 12, having a longitudinal series of perforations 13 designed to receive interchangeably a clevis, there being a second brace 14 connecting the beams in the rear of the brace 12. The beam 10 extends rearwardly beyond the beam 11, and both beams are bent downwardly to form the standards 15 and 16, respectively, carrying the shares 17 and 18, respectively.

Secured to the side of the beam 11 is a bracket 19, having upper and lower arm portions 20 and 21, the free end portions of which are bent laterally away from the beam and are perforated to slidably receive the stem 22 of a caster, including the wheel 23, which is designed to support the forward end of the plow. The caster is adjustable vertically with respect to the plow-beams, so that the depth of the furrow may be determined or the plow may be moved from place to place without engagement with the ground to make a furrow.

To adjust the caster-wheel as above described, a rock-shaft 24 is mounted transversely in the beams 10 and 11 and at one end is provided with a lever 26 for rocking it, said shaft having at its opposite end an arm 27. A lifting-lever 28 is provided with a longitudinal slot 29, in which is slidably engaged a bolt 30 on the arm 27. The lever 28 is connected with a hanger 30' on the beam 11 by means of a bolt 31 passed through said hanger and through a longitudinal slot 32 in the lever. The lever 28 is provided at one end with a socket 33, in which is received a spherical enlargement 34 on the stem 22 of the casting, so that as the lever 28 is raised and lowered the frame will be correspondingly shifted, the raising and lowering of the lifting-lever 28 being accomplished by shifting the lever 26, as will be understood. A notched segment 35 is disposed for engagement by a latch 36 on the lever 26 to hold the latter at different points of its adjustment.

From the rear end portion of the beam 10 projects a frame, including upper and lower members 40 and 41, connected at their rear ends by the vertical member 42, from which project laterally the fingers 43 and 44, in which is slidably mounted the vertical stem 45 of a caster, including a wheel 46. The stem 45 is provided with a lifting-lever 47, connected thereto in the same manner that the lever 28 is connected with the stem 22 of the front caster. The forward end of the lever 47 has a longitudinal slot 48, through which is passed a pin 49 into the front member 50 of the frame, so that when the lever 47 is raised and lowered to correspondingly move the rear caster with respect to the plow said lifting-lever may have also a longitudinal movement. Fulcrumed to the brace 51 is a lever comprising a handle portion 52 and an arm 53, to which is connected one end of the lifting-lever 47, this connection being had by means of a bolt 55, which is carried by the arm 53 and engaged through the slot 54, so that when the handle 52 is raised and lowered the lifting-lever is correspondingly moved to shift the frame with relation to the caster-wheel. A notched segment 55 is mounted concentric with the fulcrum of the lever 52, and the latter has a latch 56 for engagement with the segment to hold the lever at different points of its adjustment.

A tongue for the plow (shown at 57) is secured to the upper end of the stem 22 to swing the front caster-wheel when the plow is to be turned, and in order that the rear caster-wheel may be swung at the same time the stems 45 and 22 are provided with laterally-directed arms 58 and 59, respectively, which are connected by a rod 60, formed in sections, which are connected by a turnbuckle 61 for adjustment of the rod.

What is claimed is—

1. A plow comprising laterally-spaced mutually-connected beams, standards, shares carried by said standards, brackets carried by said beams, said brackets being provided with apertured ears, front and rear supporting-wheels including stems pivotally and slidably mounted in the ears of said brackets, lifting-levers pivotally connected with the stems and pivotally and slidably connected with the beams, and means for holding the said levers in their adjusted positions.

2. A plow comprising laterally-spaced mutually-connected beams, standards, shares carried by the standards, brackets carried by the beams, said brackets having apertured ears formed thereon, supporting-wheels including stems, said stems being slidably and pivotally engaged in the apertured ears of said brackets, hangers on one of said beams, a rock-shaft associated with one of said hangers, a lever for rocking said shaft, an arm carried by said shaft, a rod having one of its ends pivotally engaged with the other of said hangers, said arm being pivotally engaged with the said rod adjacent its end opposite its pivotal connection with the last-named hanger, a spherical enlargement on said stem and sockets carried by said rods for engagement with said enlargement, a rock-shaft mounted in the other of said brackets a rod pivoted at one of its ends to said bracket, an arm carried by said rock-shaft, pivotal connections between said arm and said rod, a spherical enlargement on the other of said stems, sockets carried by said rod for engagement with said enlargement on said stem, and a lever associated with said rock-shaft for rocking the same.

In testimony whereof I affix my signature in presence of two witnesses.

ANDREW PEDERSON.

Witnesses:
A. J. NORBY,
JOHN ANDERBERG.